United States Patent
Burinskiy et al.

(10) Patent No.: US 7,271,626 B1
(45) Date of Patent: Sep. 18, 2007

(54) SUPPRESSION OF PARASITIC RINGING AT THE OUTPUT OF A SWITCHED CAPACITOR DC/DC CONVERTER

(75) Inventors: Alexander Burinskiy, San Jose, CA (US); Nathanael Griesert, Grass Valley, CA (US); Arun Rao, Rocklin, CA (US); William J. McIntyre, Wheatland, CA (US); John Philip Parry, Grass Valley, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 4 days.

(21) Appl. No.: 10/974,177

(22) Filed: Oct. 27, 2004

(51) Int. Cl.
*H03K 3/00* (2006.01)
(52) U.S. Cl. ...................................... 327/108; 327/379
(58) Field of Classification Search ........ 327/108–112, 327/379; 326/21, 27, 87
See application file for complete search history.

(56) References Cited

U.S. PATENT DOCUMENTS

| | | | | |
|---|---|---|---|---|
| 4,992,676 A | * | 2/1991 | Gerosa et al. ................. | 326/27 |
| 5,319,252 A | * | 6/1994 | Pierce et al. ................. | 327/170 |
| 5,329,175 A | * | 7/1994 | Peterson ....................... | 326/85 |
| 5,424,653 A | * | 6/1995 | Folmsbee et al. ............ | 326/26 |
| 5,475,332 A | | 12/1995 | Ishimoto | |
| 5,483,188 A | | 1/1996 | Frodsham | |
| 5,644,252 A | * | 7/1997 | Watarai ....................... | 326/27 |
| 5,731,731 A | | 3/1998 | Wilcox et al. | |
| 5,952,863 A | | 9/1999 | Jones et al. | |
| 6,066,958 A | | 5/2000 | Taniguchi et al. | |
| 6,069,504 A | * | 5/2000 | Keeth .......................... | 327/108 |
| 6,184,729 B1 | * | 2/2001 | Pasqualini ................... | 327/112 |
| 6,300,806 B1 | * | 10/2001 | Theus et al. ................. | 327/112 |
| 6,351,149 B1 | | 2/2002 | Miyabe | |
| 6,710,617 B2 | * | 3/2004 | Humphrey .................... | 326/30 |
| 6,731,523 B2 | | 5/2004 | Jitaru | |

OTHER PUBLICATIONS

"Efficiency Improvement In Charge Pump Circuits", Chi-Chang Wang et al., IEEE Journal of Solid-State Circuits, vol. 32, No. 6, Jun. 1997.

(Continued)

*Primary Examiner*—Kenneth B. Wells
(74) *Attorney, Agent, or Firm*—Darby & Darby P.C.; Davin Chin

(57) ABSTRACT

A multi-stage transistor circuit is provided in which the multiple transistor stages are coupled in parallel and switched individually in sequence by a series arrangement of buffers. Each buffer drives the gate of a corresponding stage of the multi-stage transistor circuit with a gating signal that is delayed by each buffer. Optionally, the voltage of the gating signal can be varied. Each transistor stage may comprise one or more transistors in parallel. A switched capacitor DC/DC converter incorporating the multi-stage transistor circuit is provided in which parasitic ringing at the output is substantially reduced or eliminated. Additionally, the multi-stage transistor circuit is well suited for implementing an adaptive non-overlapping gating signal generator for complementarily driving a series arrangement of multi-stage transistors. An adaptive gating signal generator incorporating the multi-stage transistor circuit provides the minimum dead time between the gating signals that will ensure under all conditions that the multi-stage transistors will not be on at the same time.

16 Claims, 9 Drawing Sheets

OTHER PUBLICATIONS

"Optimized Control Of The 'Flying'-Capacitor Operating Voltage in 'Gear-Box'—Charge Pumps", Erich Bayer, Texas Instruments Deutschland GmbH, 85356 Freising, Germany; IEEE 20003.

"A High Efficiency Single-Cell Cascaded Charge Pump Topology", Erich Bayer et al.;Texas Instruments Deutschland GmbH, 85356 Freising, Germany (IEEE 2001).

"A Low-Ripple Swicthed-Capacitor DC-DC Up Converter For Low-Voltage Applications"; Myung-Whan Choi et al., Electronics & Telecommunications Research Institute et al., IEEE (2000).

"Buck-Boost Switched-Capacitor DC-DC Voltage Regulator Using Delta-Sigma Control Loop", A.Rao et al., Oregon State University (IEEE 2002).

* cited by examiner

SUPPRESSION OF PARASITIC RINGING AT THE OUTPUT OF A SWITCHED CAPACITOR DC/DC CONVERTER

FIELD OF THE DISCLOSURE

The present disclosure relates to current switching circuitry, and particularly to the suppression of noise during switching.

BACKGROUND

Circuits in which appreciable amounts of current are switched are often susceptible to ringing due to parasitic inductance and capacitance present in the circuit. An example of such a circuit is a switched capacitor DC/DC converter. The parasitic inductance and capacitance, primarily at the output of the DC/DC converter, in combination with the switching elements, act as an oscillatory circuit which is excited to oscillate when stimulated by a sudden change in the current therethrough. The frequency and amplitude of the oscillation will depend on the amplitude and transition time of the current change and the parameters of the parasitic elements.

DETAILED DESCRIPTION

Figure 1A:
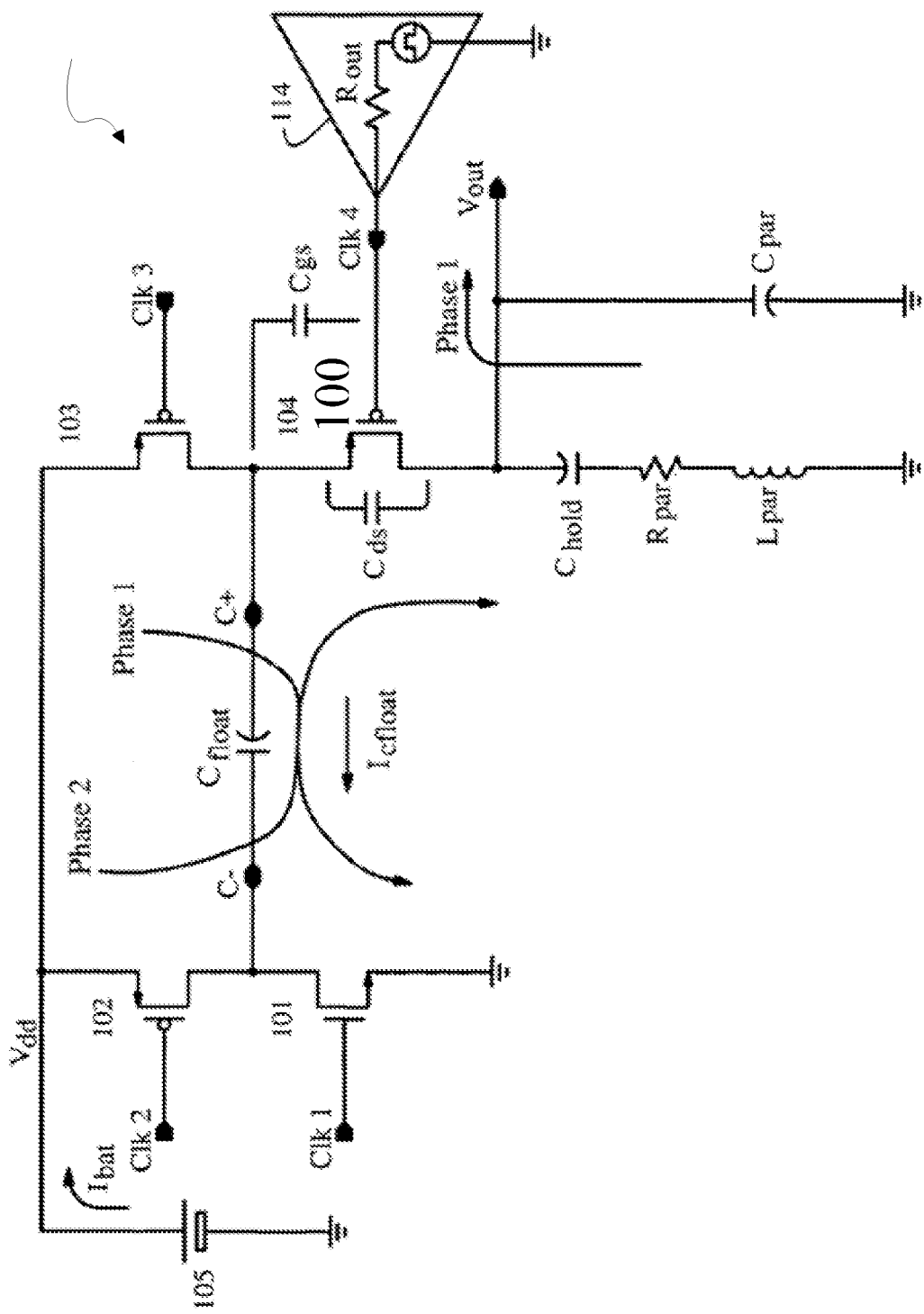
FIG. 1A shows a schematic representation of a conventional switched capacitor DC/DC converter.

FIG. 1A shows the basic configuration of a switched capacitor DC/DC converter 100. As shown in FIG. 1A, a DC voltage source 105 (e.g., battery) is coupled across a series arrangement of transistors 101 and 102 which is in parallel with a series arrangement of transistors 103 and 104 and an output capacitor, also referred to as a "hold" capacitor, designated $C_{hold}$. The drains of transistors 101 and 102 are coupled together and the drain of transistor 103 is coupled to the source of transistor 104. A second capacitor, referred to as the "float" capacitor and designated $C_{float}$ is coupled between the common node of the drains of transistors 101 and 102 and the common node of the drain and source of transistors 103 and 104.

The output of the converter 100 is at the drain of transistor 104, from which point a load (not shown) would be coupled to ground. The voltage at the output is designated $V_{out}$.

Figure 1B:
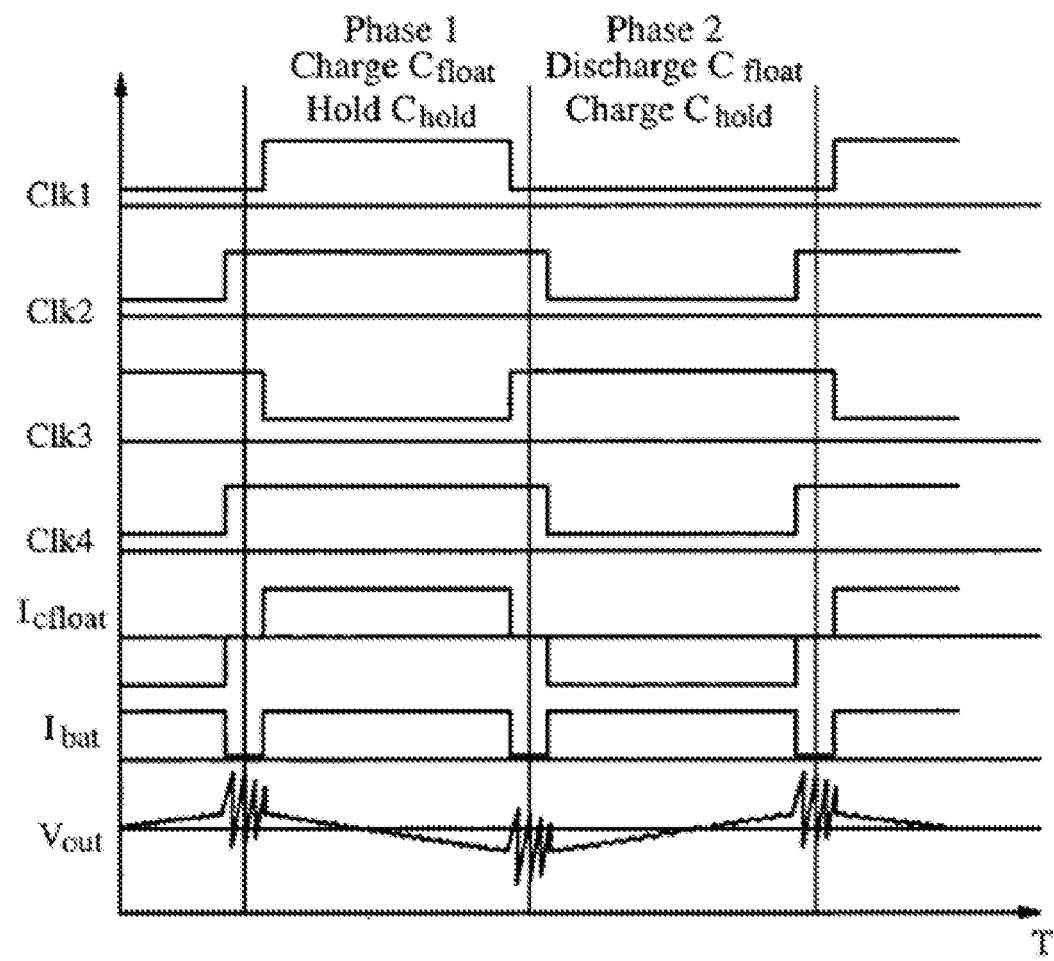
FIG. 1B shows the variation over time of a plurality of signals of the circuit of FIG. 1A.

FIG. 1B is a timing diagram showing the sequencing of gating signals Clk1-Clk4 applied to the transistors 101 through 104. Although only one cycle is shown in FIG. 1B, it is understood that the sequence shown is repeated continuously while the converter 100 is in operation. As shown in FIG. 1B, each cycle comprises two phases designated phase 1 and phase 2. During phase 1, transistors 101 and 103 are turned on while transistors 102 and 104 are turned off. During phase 2, transistors 101 and 103 are turned off while transistors 102 and 104 are turned on. To prevent shorting the voltage source 105 and causing current spikes, a short dead-time is provided between successive phases during which all transistors 101-104 are off.

The flow of current through the converter 100 during phases 1 and 2 is shown in FIG. 1A by arrows designated "phase 1" and "phase 2," respectively. As can be seen, during phase 1, the capacitor $C_{float}$ is charged by the voltage source 105 via transistors 101 and 103. Also during phase 1, current is being drawn from $C_{hold}$ by the load at the output of the converter 100 causing $C_{hold}$ to discharge. During phase 2, current flows through transistors 102 and 104 as $C_{hold}$ is charged by the series combination of the input voltage source 105 and the capacitor $C_{float}$. FIG. 1B shows how the current through the battery $I_{bat}$, the current through the float capacitor $I_{float}$, and the output voltage $V_{out}$ vary during phase 1 and phase 2.

To properly model the behavior of the converter 100, parasitic effects at the output are taken into account. These are shown in FIG. 1A as a parasitic inductance $L_{par}$ and a parasitic resistance $R_{par}$ in series with the capacitor $C_{hold}$ and a parasitic capacitance $C_{par}$ between $V_{out}$ and ground. As can be seen from FIG. 1B, because of the parasitic effects at the output of the converter 100, the output has a tendency to ring during the dead periods between phases. The ringing is due to the change in the direction, that occurs between phases, of the current flowing through the capacitor $C_{hold}$, the parasitic inductance $L_{par}$, and the parasitic capacitance $C_{par}$.

The change in current $\Delta I$ through the parasitic inductance $L_{par}$ causes a voltage spike at the output whose magnitude $V_{spike}$ can be approximated by the following expression:

$$V_{spike}=L_{par}\Delta I/T_{rise}, \quad (1)$$

where $T_{rise}$, the rise time of the current change at the output can be approximated as follows:

$$T_{rise}=2\pi R_{out}(C_{gs}+C_{ds}), \quad (2)$$

where $R_{out}$ is the output impedance of a driver 114 that drives the gate of transistor 104, $C_{gs}$ is the gate/source (or input) capacitance of the transistor 104, and $C_{ds}$ is the drain/source capacitance of the transistor 104.

Due to the parasitic capacitance $C_{par}$, ringing occurs at the output $V_{out}$ with a frequency of:

$$f_o=1/[2\pi(L_{par}C_{par})^{1/2}] \quad (3)$$

The resonant quality factor for the output circuit can be estimated as:

$$Q=(L_{par}/C_{par})^{1/2}/R_{par} \quad (4)$$

If $Q>0.5$, ringing occurs, whereas if $Q<0.5$, the output circuit is damped with a single pulse occurring which asymptotically approaches the steady state level.

Because the gate/source capacitance $C_{gs}$ of transistor 104 cannot be charged and discharged instantaneously, transistor 104 will be in an active state for a given period of time as it transitions between the on and off states. In the active state, the transistor will see the following current from the float capacitor $C_{float}$:

$$I(t) = C_{float} dV_{float}/dt \qquad (5)$$

Figure 2:
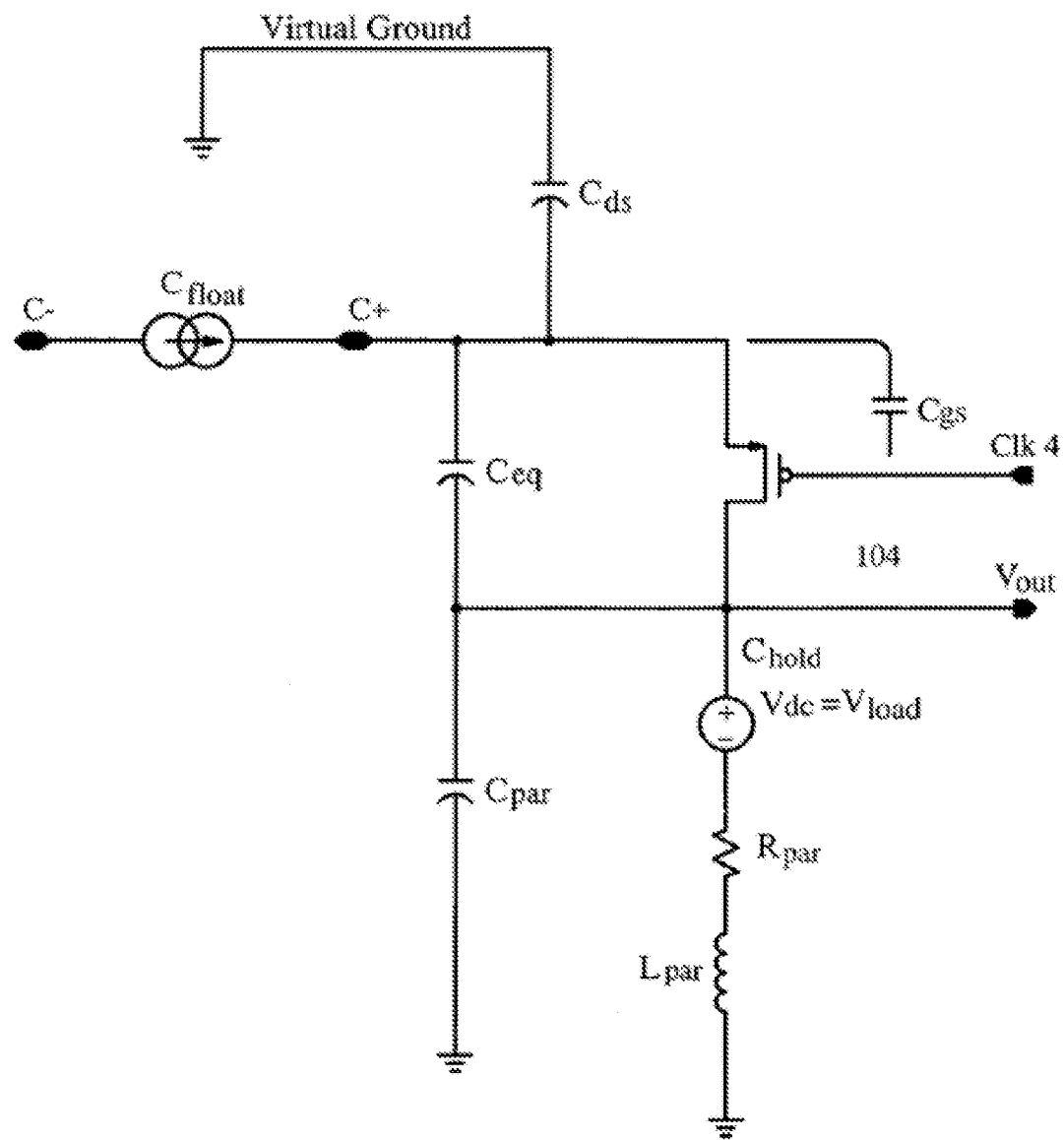
FIG. 2 shows an equivalent circuit model of the circuit of FIG. 1A during a transitional state of operation.

This transitional state can be modeled as shown in FIG. 2 in which the capacitor $C_{float}$ can be approximated by a current source and the output capacitor $C_{hold}$ can be approximated by a voltage source. The circuit of FIG. 2 is essentially a Colpitz oscillator. In the circuit of FIG. 2, transistor 103 can be replaced by its drain/source capacitance $C_{ds}$ coupled to ground. The capacitance across the drain and source of transistor 104 is shown as $C_{eq}$.

A feedback parameter $\lambda$ for the circuit can be approximated as follows:

$$\lambda = [C_{eq}/(C_{eq}+C_{ds})] gm(t)[L_{par}/(R_{par}C_{par})], \qquad (6)$$

where gm(t) is the transconductance (i.e., current gain) of the transistor 104. If $\lambda > 1$, the circuit will oscillate between phases, as shown in FIG. 11B. If $\lambda < 1$, however, dampened ringing will occur (i.e., oscillation with asymptotically diminishing amplitude).

Thus, as shown from the above analysis, the output of a typical switched capacitor DC/DC converter is prone to ringing. Such noise is undesirable in applications calling for stable, clean DC power.

With reference to Eq. 6, discussed above, it can be seen that parasitic ringing at the output of the switched capacitor circuit can be reduced by reducing the feedback parameter $\lambda$ exhibited by the circuit during the transient state in which the transistor 104 is active. The feedback parameter $\lambda$, in turn, can be reduced by reducing the transconductance gm(t) of the transistor 104. The transconductance gm(t) of a transistor can be expressed as follows:

$$gm(t) = (KW/L)^{1/2} f[V_{gs}(t), V_{ds}(t)], \qquad (7)$$

where W and L are the width and length respectively, of the transistor, K is a process-dependent constant, and f(x, y) is a function of the gate/source and drain/source voltages of the transistor. As can be seen from Eq. 7, the transconductance gm(t) can be reduced by reducing the width W of the transistor and/or by increasing the length L of the transistor.

Figure 3:
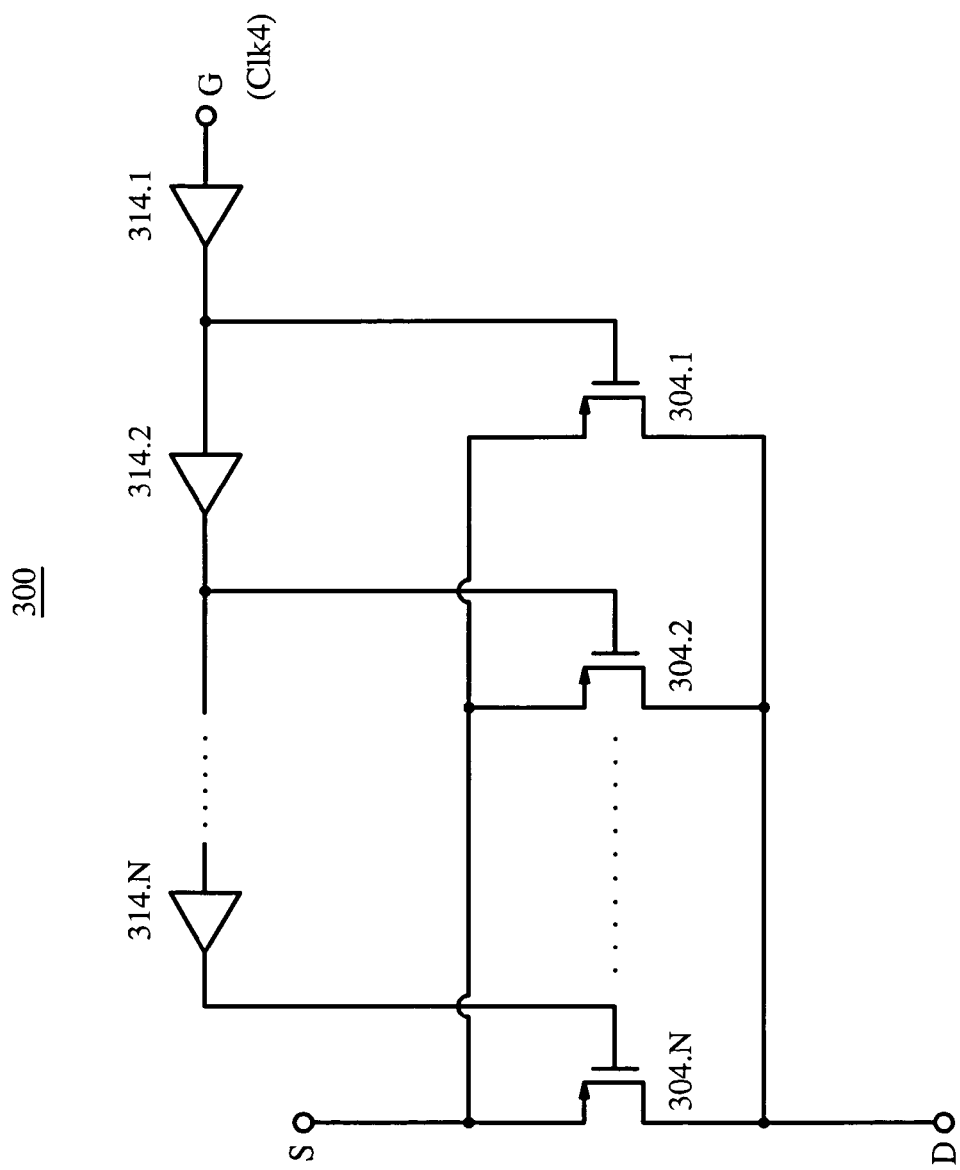
FIG. 3 shows a schematic representation of an exemplary embodiment of a multi-stage transistor circuit in accordance with the present invention.

In an exemplary embodiment of the present invention, a switched capacitor DC/DC converter is provided having the general configuration shown above in FIG. 1A. In the exemplary converter of the present invention, the transistor 104 is replaced by the circuit 300 shown in FIG. 3. The circuit 300 comprises a plurality of transistors 304.1 through 304.N coupled in parallel; i.e., the drains of the transistors are coupled together and the sources of the transistors are coupled together. Each of the transistors 304.1-304.N has a width of W/N, where W is the width of the transistor 104 that is replaced. In other words, the transistor 104 has been split into N sections. As can be seen from Eq. 7, the transconductance of each transistor 304.1-304.N is $N^{-1/2}$ of the transconductance of the original transistor 104 that is replaced. Thus, for example, if the transistor 104 is divided width-wise into 16 sections, the transconductance of each resultant transistor will be ¼ of that of transistor 104.

The gates of the transistors 304.1 through 304.N are coupled to the outputs of respective buffers 314.1 through 314.N. The buffers 314.1 through 314.N are coupled in a cascade arrangement, with each buffer driving a respective transistor and the next buffer in the arrangement. Each buffer preferably has a gain of at least 1.0 and introduces a delay $T_{del}$ to the gating signal propagating therethrough. $T_{del}$ is selected to be sufficiently large so as to effectively cause each transistor 304.1-304.N to turn on one at a time, for an enabling gating signal, or off one at a time, for a disabling gating signal. The resultant feedback parameter $\lambda$ (see Eq. 6) for the Colpitz-like oscillator circuit that is formed (see FIG. 2) will be a factor of $N^{-1/2}$ of the feedback parameter with the original, undivided, transistor 104.

Dividing the transistor 104 into N sections also reduces the input capacitance of each section so that the gate-source capacitance of each section will be only $C_{gs}/N$, where $C_{gs}$ is the capacitance of the original transistor 104. As a result, the output of each buffer 314.1-314.N-1 is loaded only by $C_{gs}/N$ and the input capacitance $C_{inp}$ of the next buffer. Where each buffer is implemented using inverters (e.g., an even number of inverters in series, such as described below), the input capacitance $C_{inp}$ of each buffer 314.1-N can be expressed as follows:

$$C_{inp} = C_{gs}\_inv + K_{inv} C_{gd}\_inv, \qquad (8)$$

where $K_{inv}$ is the gain of the first inverter (i.e., the inverter at the input of the buffer), and $C_{gs}\_inv$ and $C_{gd}\_inv$ are respectively the input and the input-output capacitance of the inverter.

Moreover, the driving requirements of the driver 114 that is used to drive the gating input G of the circuit 300 are reduced, as compared to that of the conventional circuit, because the driver 114 need only drive the buffer 314.1. The driver 114 is thus loaded by the input capacitance $C_{inp}$ of a single buffer.

Because of the step-by-step activation of the transistors 304.1-304.N, the slope of the current change through the output circuit is substantially reduced, which in turn reduces the magnitude of the voltage spike $V_{spike}$ at the output, as estimated by Eq. 1 above. With the rise time $T_{rise}$ of the current now being approximately $NT_{del}$, the magnitude of the output voltage spike will be approximately:

$$V_{spike} = L_{par} \Delta I / (NT_{del}) \qquad (9)$$

If $NT_{del}$ is substantially greater than $T_{rise}$ of the conventional circuit (as approximated by Eq. 2 above), $V_{spike}$ will be significantly reduced. In an exemplary DC/DC converter in accordance with the present invention, the product $NT_{del}$ is preferably much smaller than $0.5/F_{osc}$, where $F_{osc}$, is the frequency of oscillation of the converter.

As such, by splitting the power transistor 104 into multiple stages, each of which is switched in sequence, any parasitic ringing at the output of the circuit is substantially reduced or eliminated due to the reduction in transconductance of the power transistor and the increase in rise time of the current change through the output circuit.

Figure 4:
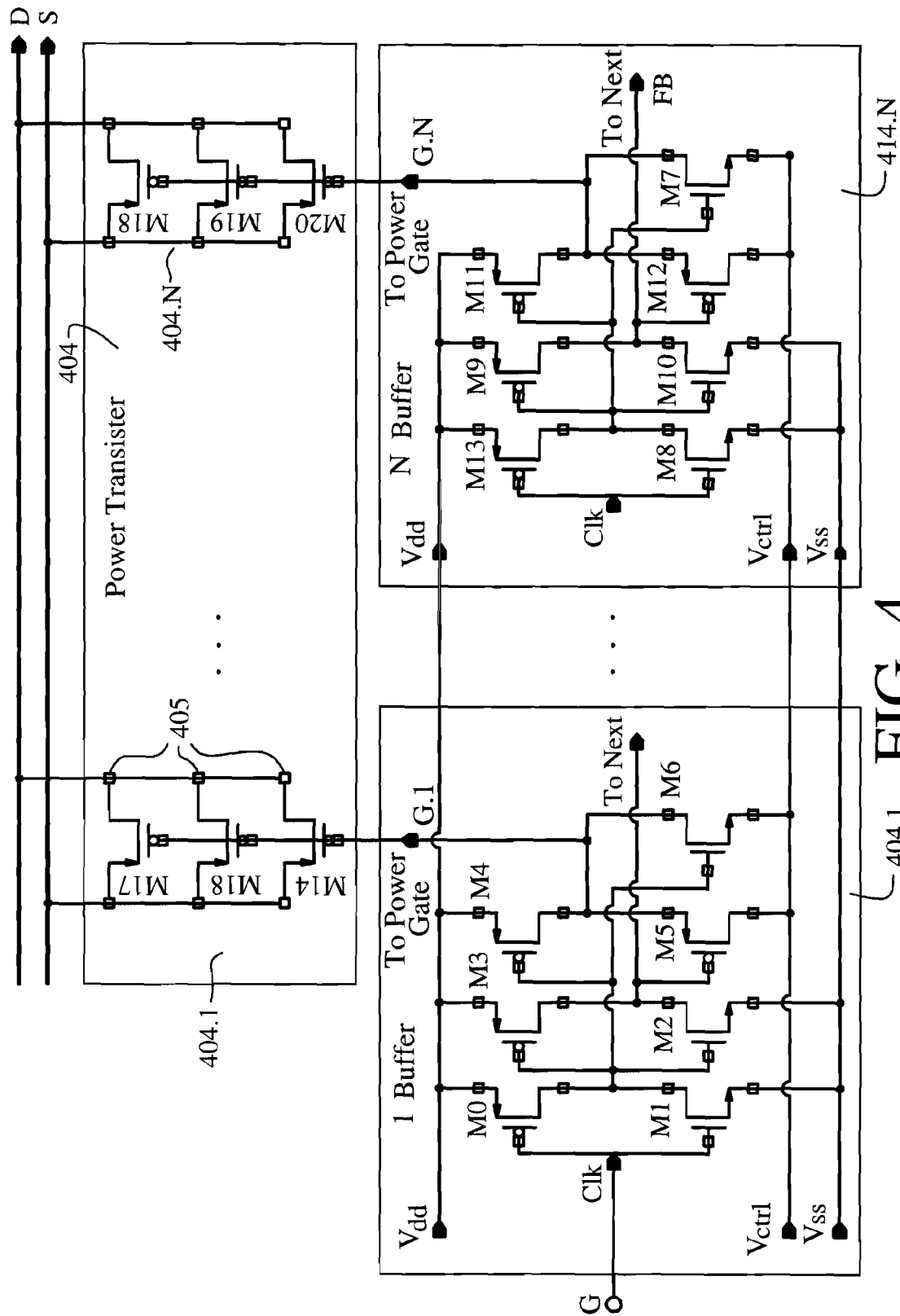
FIG. 4 shows a more detailed schematic representation of an exemplary embodiment of a multi-stage transistor circuit in accordance with the present invention.

An exemplary embodiment of a multi-stage transistor circuit 400 in accordance with the present invention is illustrated in FIG. 4. In the circuit 400, a power transistor section 404 is divided into multiple (N) individual transistor blocks 404.1 through 404.N. In an exemplary embodiment, N=20. Each transistor block 404.1-N comprises a plurality of transistors 405 arranged in parallel (i.e., with their drains coupled together and their sources coupled together), and also having their gates coupled together. In the exemplary embodiment shown, each transistor block 404.1-N comprises three P-channel metal-oxide semiconductor (PMOS) transistors 405. In other exemplary embodiments, each transistor block 404.1-N comprises one or more individual transistors 405 in parallel and also having their gates coupled together.

As with circuit 300, circuit 400 comprises a series arrangement of buffers 414.1 through 414.N, each driving the gate of the corresponding transistor block 404.1-404.N and the next buffer in the arrangement. In the exemplary embodiment shown, the voltage that is applied to the gates of the transistor blocks can be controlled by a signal $V_{ctrl}$.

In the circuit 400, each buffer 414.1-414.N comprises a first inverter comprised of complementary transistors M0 and M1, in series with a second inverter comprised of complementary transistors M2 and M3. The gating signal G for the multi-stage circuit 400 is provided to the input of the first inverter M0, M1 of the buffer 414.1. The output of the second inverter M2, M3 of the buffer 414.1 (ToNext) is provided to the input of the next buffer 414.2. The gating signal G is thus delayed and provided uninverted by each buffer 414.1-414.N-1 to the input of the next buffer in the series arrangement of buffers. The output of the last buffer 414.N can be provided as an output (FB) of the circuit 400. A use for this output will described in greater detail below.

In each buffer 414.1-414.N, the output of the first inverter M0, M1 is also provided to the gates of complementary transistors M4 and M6, whereas the output of the second inverter M2, M3 is provided to the gate of a transistor M5. The drain of M5 and the source of M6 are tied to $V_{ctrl}$ while the source of M5 and the drain of M6 are tied to the gate (G.1-G.N) of the respective transistor block 404.1-404.N. When the gating signal G is at a low level, the transistors M5 and M6 turn on, essentially applying the voltage $V_{ctrl}$ to the gate of the corresponding transistor block 404.1-404.N. A low level at the gating signal G thus results in applying the voltage $V_{ctrl}$ to the gates of the transistor blocks 404.1-404.N.

When the gating signal G is at a high level, the transistors M5 and M6 turn off while transistor M4 turns on, essentially pulling the gate of the corresponding transistor block 404.1-404.N up to $V_{dd}$. Where, as in the exemplary embodiment shown, the transistor blocks 404.1-404.N are comprised of PMOS transistors 405, a high level at the gating signal G results in turning off the transistor blocks 404.1-404.N.

Although an embodiment using PMOS transistor blocks 404 has been described, the present invention is just as applicable to NMOS implementations.

In embodiments in which control of the gate voltage is not provided, the transistors M4, M5 and M6 can be eliminated and the output of the second inverter M2, M3 can be provided directly to the gate of the corresponding transistor block 404.1-404.N.

Figure 5:
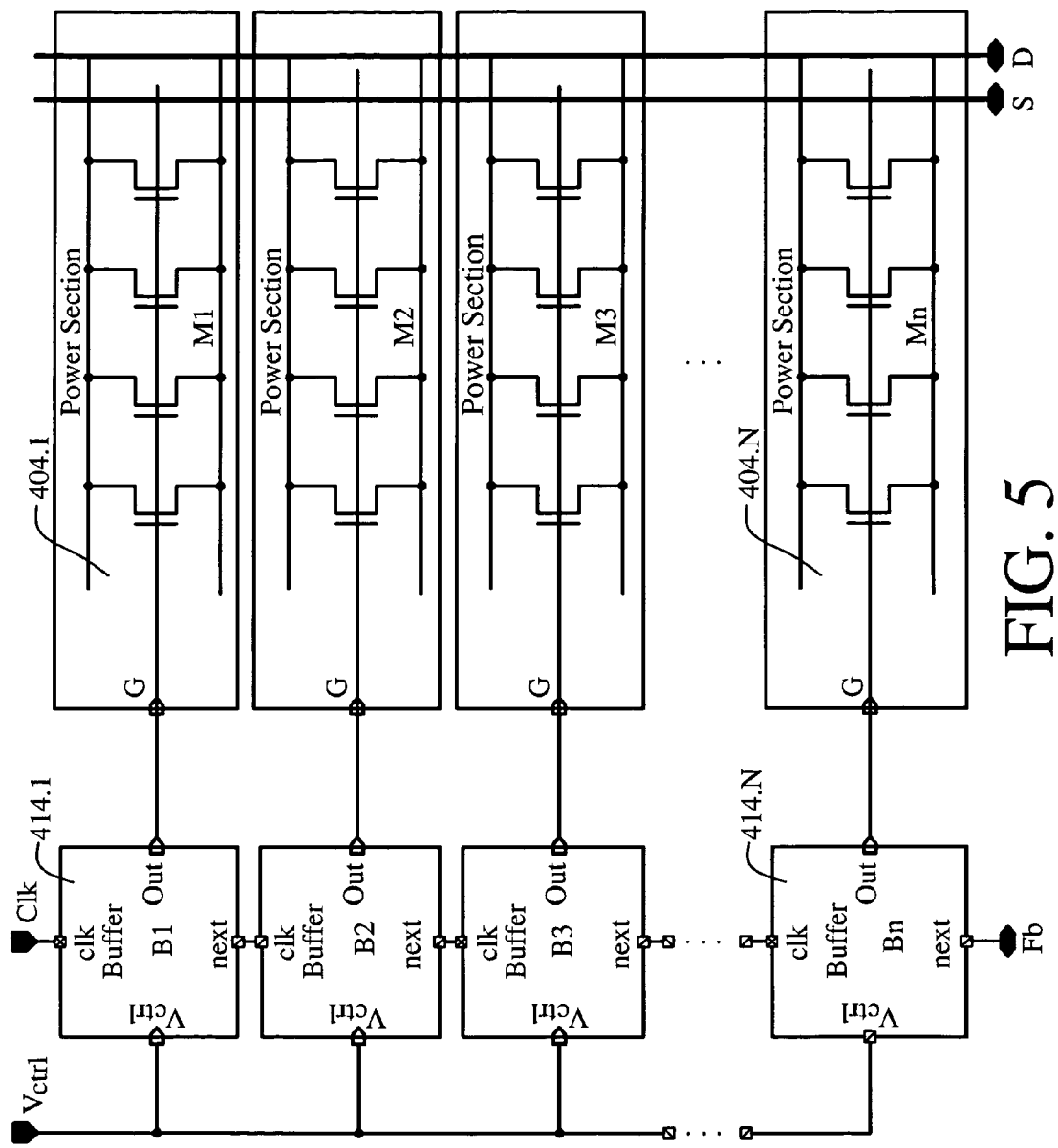
FIG. 5 shows the layout of an exemplary embodiment of a multi-stage transistor circuit in accordance with the present invention.

An exemplary layout of a circuit 400 in accordance with the present invention is illustrated in FIG. 5. The exemplary layout shown in FIG. 5 preferably minimizes the area of the interconnections (typically metallic) between the buffers 414.1-414.N and the transistor blocks 404.1-404.N.

In a further aspect of the present invention, an adaptive, non-overlapping gating signal generator is provided for complementarily driving a series arrangement of transistors. The adaptive generator of the present invention provides the minimum gap or dead time between the gating signals that will ensure, under all conditions, that both transistors will not be on at the same time. As a result, short circuit conditions are prevented with minimal impact on efficiency.

Figure 6:
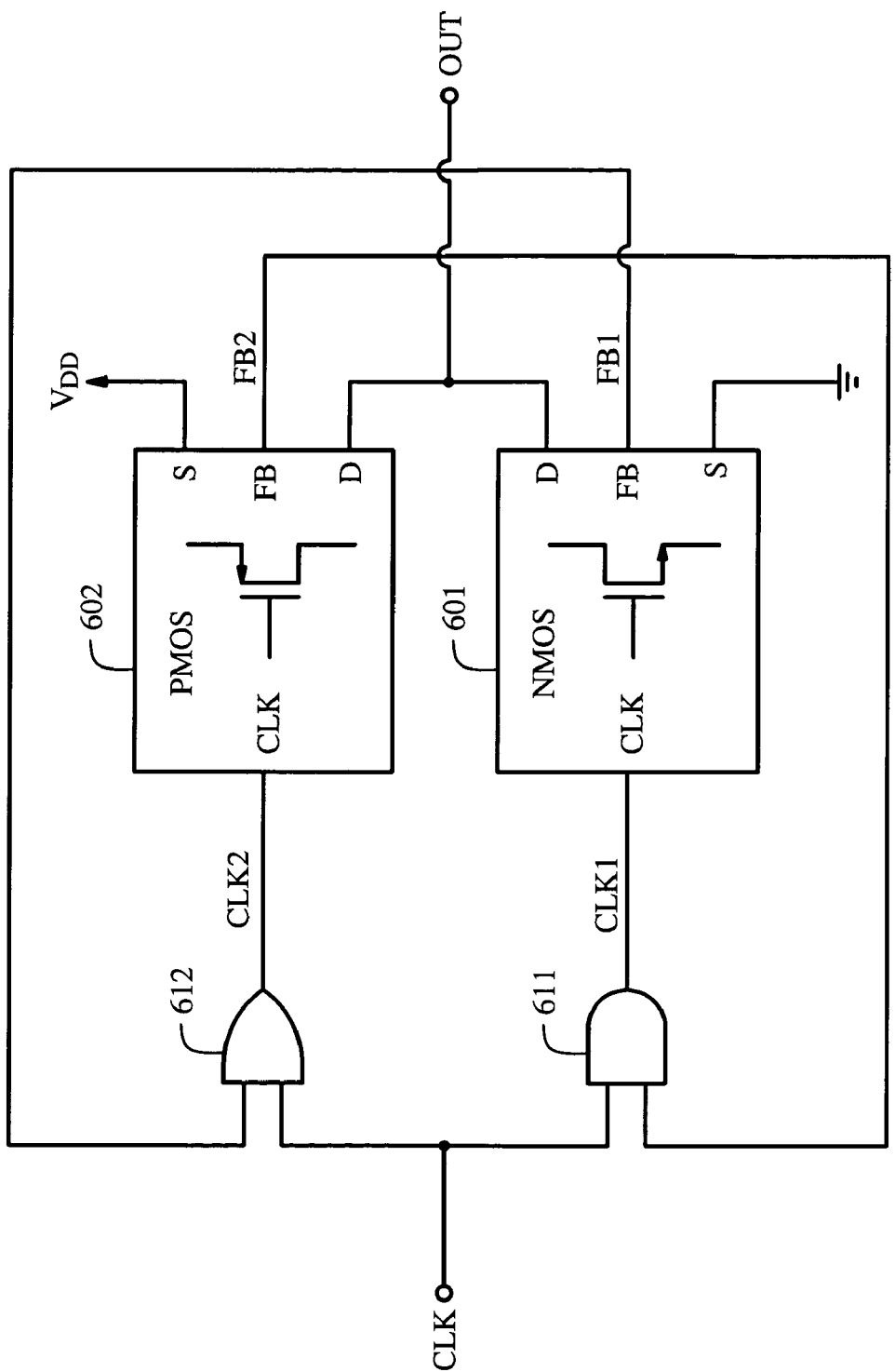
FIG. 6 shows a schematic representation of an exemplary embodiment of a non-overlapping clock generating arrangement in accordance with the present invention.
Figure 7:
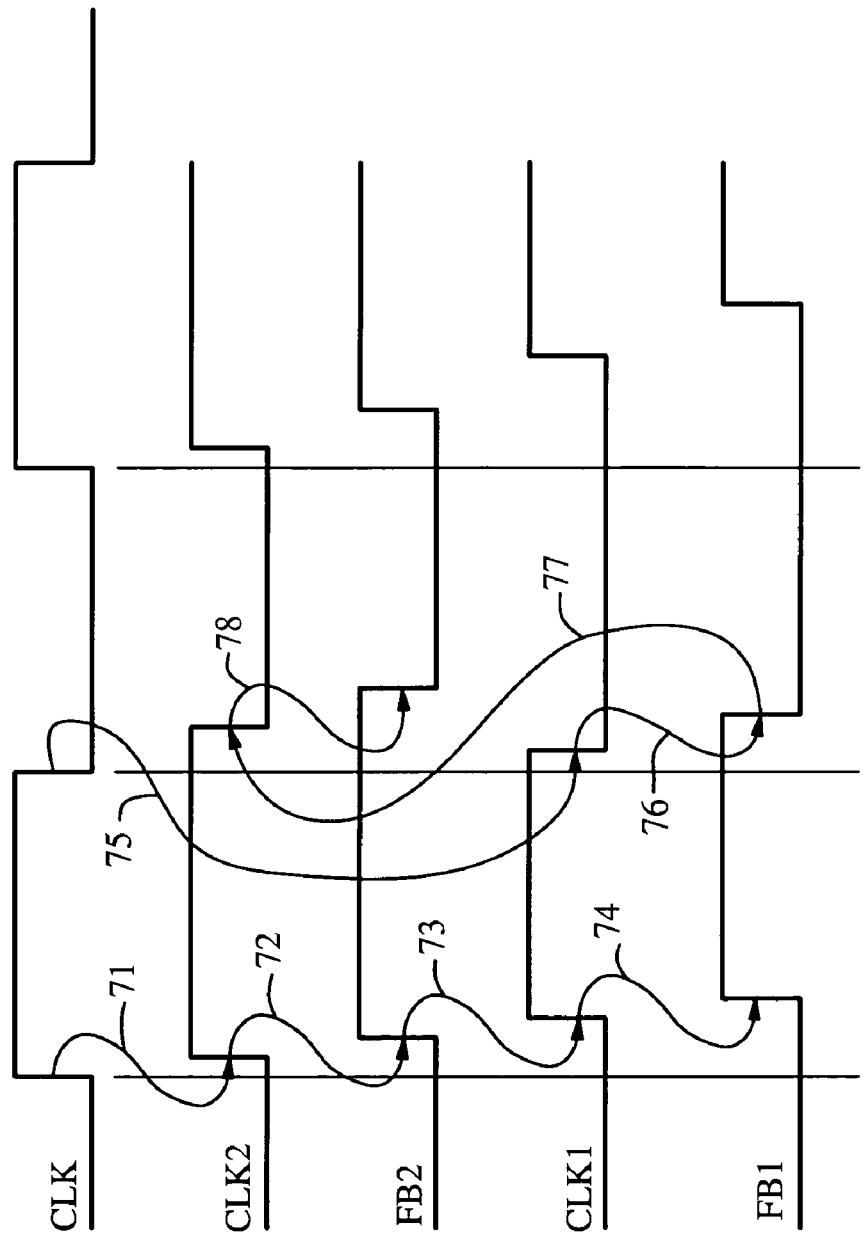
FIG. 7 shows the variation over time of a plurality of signals of the arrangement of FIG. 6.

FIG. 6 shows an exemplary embodiment of an adaptive non-overlapping clock generator in accordance with the present invention. FIG. 7 shows a timing diagram of the relevant signals of the generator of FIG. 6.

As shown in FIG. 6, a multi-stage N-channel metal-oxide semiconductor (NMOS) transistor circuit 601 is in series with a multi-stage PMOS transistor circuit 602. The circuits 601 and 602 can be implemented as described above in connection with the circuit 300 of FIG. 3. The arrangement of FIG. 6 can be used in any application in which transistors in series are switched in a complementary fashion, such as the switched capacitor circuit of FIG. 1A. For example, the multi-stage transistor circuits 601 and 602 can replace the transistors 101 and 102, respectively, or the transistors 103 and 104 shown in the circuit of FIG. 1.

A periodic clock signal CLK drives the generator of FIG. 6 which generates a first gating signal CLK1 for driving the multi-stage transistor circuit 601 and a second gating signal CLK2 for driving multi-stage transistor circuit 602. A first feedback signal FB1 is the output of the last buffer in the chain of buffers used to drive the multiple transistor stages of the circuit 601 and is substantially the signal CLK1 delayed by $NT_{del}$, where N is the number of stages of 601 and $T_{del}$ is the delay through each buffer of 601. Similarly, a second feedback signal FB2 is the output of the last buffer in the chain of buffers used to drive the multiple transistor stages of the circuit 602 and is substantially the signal CLK2 delayed by $NT_{del}$.

As shown in FIG. 6, CLK1 is generated by logically ANDing the feedback signal FB2 with the input clock signal CLK in a logic gate 611, whereas CLK2 is generated by ORing the feedback signal FB1 with the input clock signal CLK in a logic gate 612. As can be appreciated, the exact implementation will depend on the polarities of the signals involved and other design considerations.

As shown in FIG. 7, a low-to-high transition of the CLK signal causes a low-to-high transition of the CLK2 signal after a propagation delay 71 through the gate 612. After a delay 72 through the buffer chain of the transistor circuit 602, the feedback signal FB2 also transitions from low to high. The delay 72 is substantially $NT_{del}$. At this point, all of the stages of the multi-stage PMOS transistor circuit 602 will be off and the process of turning on the multi-stage NMOS transistor circuit 601 can begin.

The low-to-high transition of FB2 causes CLK1 to transition from low to high after a propagation delay 73 through the gate 611. After a delay 74 through the buffer chain of the transistor circuit 601, the feedback signal FB1 also transitions from low to high. The delay 74 is substantially $NT_{del}$. At this point, all of the stages of the NMOS multi-stage transistor circuit 601 will be on.

As further shown in FIG. 7, a high-to-low transition of the CLK signal causes a high-to-low transition of the CLK1 signal after a propagation delay 75 through the gate 611. After a delay 76 through the buffer chain of the transistor circuit 601, the feedback signal FB1 also transitions from high to low. The delay 76 is substantially $NT_{del}$. At this point, all of the stages of the multi-stage NMOS transistor circuit 601 will be off and the process of turning on the multi-stage PMOS transistor circuit 602 can begin.

The high-to-low transition of FB1 causes CLK2 to transition from high to low after a propagation delay 77 through the gate 612. After a delay 78 through the buffer chain of the transistor circuit 602, the feedback signal FB2 also transitions from high to low. The delay 78 is substantially $NT_{del}$. At this point, all of the stages of the PMOS multi-stage transistor circuit 602 will be on.

As can be appreciated, although each of the delays 72, 74, 76 and 78 is nominally $NT_{del}$, the actual delays can vary substantially (e.g., +/−50% or more) due to processing variations in the implementing circuitry and variations in operating conditions (e.g., supply voltage, temperature). This variability is further increased by using a gating signal level $V_{ctrl}$ that is non-zero (in the case of a PMOS implementation) or less than the supply voltage (in the case of a NMOS implementation), as described above. The exemplary non-overlap clock generation scheme of the present invention, however, ensures that there will be no overlap in the on states of the transistor circuits 601 and 602 regardless of how widely the delays 72, 74, 76 and 78 may vary.

Figure 8:
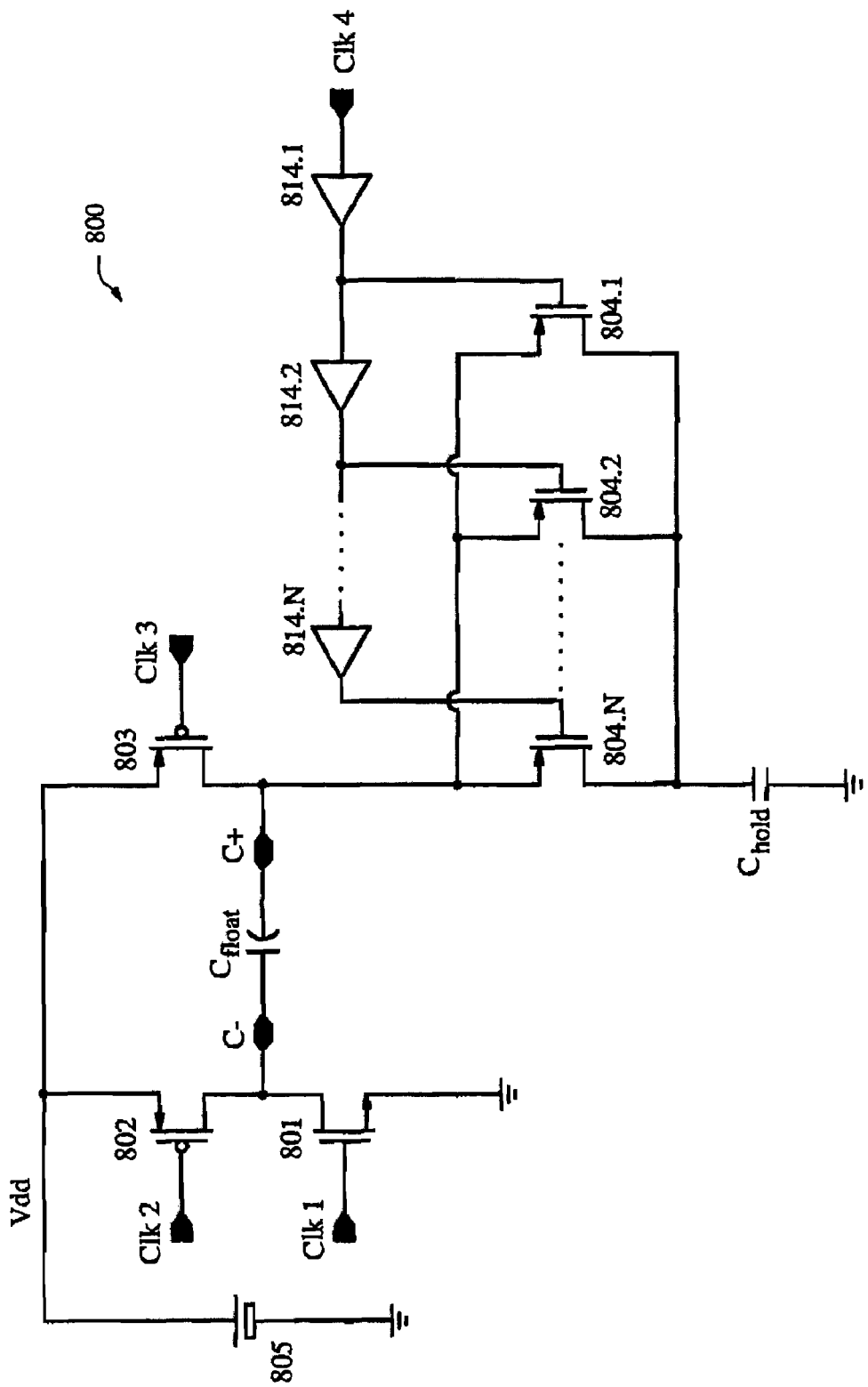
FIG. 8 shows a schematic representation of a switched capacitor DC/DC converter including an exemplary embodiment of a multi-stage transistor circuit in accordance with the present invention.

An exemplary embodiment of a switched capacitor DC/DC converter 800 including an exemplary embodiment of a multi-stage transistor circuit 804 is shown in FIG. 8.

It is to be understood that while the invention has been described above in conjunction with preferred embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims. For example, even though the exemplary embodiments described above show metal-oxide semiconductor field effect transistors (MOSFETs), the present invention can also be applied to bipolar transistor circuits.

It is further to be understood that all values are to some degree approximate, and are provided for purposes of description.

The disclosures of any patents, patent applications, and publications that may be cited throughout this application are incorporated herein by reference in their entireties.

What is claimed is:

1. A circuit, comprising:
   a switched capacitor converter, including:
      a first transistor stage including a first control input for controlling a state of the first transistor stage, wherein the first transistor stage is arranged to selectively provide a first current path between a first node and a second node;
      a second transistor stage including a second control input for controlling a state of the second transistor stage, wherein the second transistor stage is arranged to selectively provide a second current path between the first node and the second node;
      a first buffer for driving the first control input; and
      a second buffer including:
         a first inverter having at least an input coupled to an output of the first buffer and an output;
         a second inverter having at least an input coupled to the output of the first inverter and an output; and
         a driving circuit, wherein the driving circuit has at least a first voltage supply input, a second voltage supply input, a driving control input coupled to output of the first inverter, a driving voltage input, and a driving voltage output coupled to the first control input, wherein the driving voltage output is based, at least in part, on the driving voltage input and the driving control input, and wherein the driving voltage input is distinct from the first supply voltage input and is distinct from the second supply voltage input, whereby the second transistor stage changes state an interval of time after the first transistor stage changes state.

2. The circuit of claim 1, wherein the first transistor stage includes a plurality of transistors, and wherein each transistor in the plurality of transistors is coupled to the first node, the second node, and the first control input.

3. The circuit of claim 1, wherein the first buffer includes two inverters arranged in series.

4. The circuit of claim 1, wherein the first and second transistor stages include p-channel metal oxide semiconductor transistors.

5. The circuit of claim 1, wherein the first and second transistor stages include n-channel metal oxide semiconductor transistors.

6. The circuit of claim 1, wherein the driving circuit further includes:
   a first drive transistor; and
   a second drive transistor, wherein the first drive transistor and the second drive transistor are arranged to operate as a complementary pair.

7. The circuit of claim 2, wherein the cardinality of transistors in the plurality of transistors is three.

8. The circuit of claim 1, wherein the driving circuit includes:
   a first transistor that is arranged to selectively couple the first supply voltage input to the first control input while the output of the first inverter is at a first state;
   a second transistor that is arranged to selectively couple the driving voltage input to the first control input while the output of the first inverter is at a second state; and
   a third transistor that is arranged to selectively couple the driving voltage input to the first control input while the output of the second inverter is at the first state.

9. The circuit of claim 1, wherein the driving circuit includes:
   a first transistor having at least a gate, a drain, and a source, wherein the gate of the first transistor is coupled to the output of the first inverter, the drain of the first transistor is coupled to the first control input, and the source of the first transistor is coupled to the first supply voltage input;
   a second transistor having at least a gate, a drain, and a source, wherein the gate of the second transistor is coupled to output of the first inverter, the drain of the second transistor is coupled to the first control input, and the source of the second transistor is coupled to the driving voltage input; and
   a third transistor having at least a gate, a drain, and a source, wherein the gate of the third transistor is coupled to the output of the second inverter, the drain of the third transistor is coupled to the driving voltage input, and the source of the third transistor is coupled to the first control input.

10. A voltage converter circuit comprising:
    a first resistive channel that is coupled between a first node and a second node, wherein the resistance of the first resistive channel is changeable based, in part, upon a first control signal; and
    a second resistive channel that is coupled between the first node and the second node, wherein the resistance of the second resistive channel is changeable based, in part, upon a second control signal; and
    a buffer circuit having at least a buffer input that is arranged to receive the first control signal, a buffer output that is arranged to provide the second control signal, a first voltage supply input, a second voltage supply input, and a driving voltage input, wherein the second control signal is based, at least in part, on the driving voltage input and the first control signal, and wherein the driving voltage input is distinct from the first supply voltage input and is distinct from the second supply voltage input; and a supply multiplier circuit having at least an input that is coupled to a supply voltage and an output that is coupled to the first node, wherein the supply multiplier circuit is arranged to periodically provide a multiplied voltage at the first node.

11. The voltage converter circuit of claim 10, wherein the supply multiplier circuit is arranged such that the magnitude of the multiplied voltage is larger than the magnitude of the supply voltage.

12. The voltage converter circuit of claim 10, wherein the supply multiplier circuit further includes a switched capacitor.

13. The voltage converter circuit of claim 10, wherein the supply multiplier circuit further includes:
- a first transistor that is arranged to selectively couple a first capacitor terminal of a switched capacitor to the supply voltage; and
- a second transistor that is arranged to selectively couple a second capacitor terminal of the switched capacitor to the supply voltage.

14. The voltage converter circuit of claim 10, further comprising: a load capacitor that is coupled to the second node.

15. The circuit of claim 10, wherein the buffer circuit includes:
- a first transistor that is arranged to selectively couple the first supply voltage input to the first control signal while the output of a first inverter is at a first state;
- a second transistor that is arranged to selectively couple the driving voltage input to the first control signal while the output of the first inverter is at a second state; and
- a third transistor that is arranged to selectively couple the driving voltage input to the first control signal while the output of a second inverter is at the first state.

16. A method of switching an output, comprising:
- activating a first switching circuit to provide a first resistive channel between a switched capacitance and a load capacitance, wherein the load capacitance is coupled to an output;
- providing a driving voltage signal that is distinct from a first supply voltage and is distinct from a second supply voltage;
- activating a second switching circuit to provide a second resistive channel between the switched capacitance and the load capacitance, wherein the second switching channel is activated an activation delay time period after the first switching stage is activated, wherein the second switching circuit is arranged such that it is activated by a control input, and wherein that control input is driven based, at least in part, upon the driving voltage signal;
- deactivating the first switching circuit to disable the first resistive channel; and
- deactivating the second switching circuit to disable the second resistive channel, wherein the second resistive circuit is deactivated a deactivation delay time period after the first switching circuit is deactivated, and wherein the activation delay time period is substantially equal to the deactivation delay time period.

* * * * *